United States Patent
Suzuki et al.

[11] Patent Number: 5,935,403
[45] Date of Patent: *Aug. 10, 1999

[54] MAGNETIC THIN FILM AND MAGNETIC THIN FILM MANUFACTURING METHOD

[75] Inventors: Koichi Suzuki, Osaka; Kenji Komaki, Mishima-gun, both of Japan

[73] Assignee: Read-Rite SMI Corporation, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/881,300

[22] Filed: Jun. 24, 1997

[51] Int. Cl.⁶ .................................................. C25D 15/00
[52] U.S. Cl. ........................... 205/109; 205/119; 205/922
[58] Field of Search ................... 205/109, 119, 205/255, 922

[56] References Cited

U.S. PATENT DOCUMENTS

| | | | |
|---|---|---|---|
| 3,737,583 | 6/1973 | Tsuchiya et al. | 205/119 |
| 4,102,756 | 7/1978 | Castellani et al. | 4/4 |
| 4,661,216 | 4/1987 | Anderson et al. | 204/44.5 |
| 5,489,488 | 2/1996 | Asai et al. | 4/4 |

FOREIGN PATENT DOCUMENTS

| | | |
|---|---|---|
| 61-264698 | 11/1986 | Japan . |
| 1-175707 | 7/1989 | Japan . |
| 5242427 | 9/1993 | Japan . |

*Primary Examiner*—K. Mayekar
*Attorney, Agent, or Firm*—Blakely, Sokoloff, Taylor & Zafman, LLP

[57] ABSTRACT

A magnetic thin film manufacturing method in which an object of treatment is electroplated in a plating bath so that a magnetic thin film is formed on the surface of the object of treatment. The plating bath contains two or more types of ions selected from a set consisting of $Fe^{2+}$ ions, $Ni^{2+}$ ions and $Co^{2+}$ ions, and fine particles of an insulating material are dispersed in the plating bath. In a more particular embodiment of the invention, a magnetic thin film manufacturing method is characterized by the fact that [a] the aforementioned two or more types of ions selected from a set consisting of $Fe^{2+}$ ions, $Ni^{2+}$ ions and $Co^{2+}$ ions are supplied by means of sulfates and/or chlorides, [b] the plating bath is an acidic bath, and [c] the fine particles of an insulating material that are dispersed in the plating bath are colloidal particles of $SiO_2$ and/or $Al_2O_3$.

3 Claims, 2 Drawing Sheets

MAGNETIC THIN FILM AND MAGNETIC THIN FILM MANUFACTURING METHOD

BACKGROUND OF THE INVENTION

1. Technical Field of the Invention

The present invention concerns a magnetic thin film and a magnetic thin film manufacturing method. The magnetic thin film of the present invention can be used as a magnetic shield or a magnetic body in a thin-film magnetic head which is suitable for high-density magnetic recording; this magnetic thin film has a high saturation flux density, is superior in terms of soft magnetic characteristics, and has a high resistivity.

Furthermore, the present invention also concerns a thin-film magnetic head manufacturing method.

2. Background Information

In recent years, thin films formed by plating have been widely used in electronic parts, etc., not only for decorative purposes and anti-corrosion purposes, but also as functional thin films with specified functions. For example, permalloy magnetic thin films manufactured by plating processes are used as magnetic bodies in thin-film magnetic heads of hard disk drives, which are external memory devices used in computers. Permalloy is a typical soft magnetic thin film material; in particular, a permalloy alloy consisting of 82 atomic % Ni and 18 atomic % Fe is characterized by a magnetostriction constant of zero or a magnetostriction constant which has a negative value.

Over the years, there have been increasingly stronger demands for increased capacity and reduced size in hard disk drives; accordingly, recording densities have become increasingly higher, and materials with higher saturation flux densities have been required in the magnetic bodies of heads used to read such high-density recording. In order to obtain a higher saturation flux density in a permalloy magnetic thin film, it is necessary to increase the Fe content; however, if the Fe content is excessively increased, the magnetostriction constant increases so that the playback performance becomes unstable. Accordingly, there are limits to how far the saturation flux density can be increased in a simple permalloy magnetic thin film.

Meanwhile, Co-Ni-Fe ternary alloys have attracted attention as magnetic materials which can be used in place of permalloy materials with a composition of 82 atomic % Ni and 18 atomic % Fe.

FIG. 4 is an explanatory diagram which shows the relationship between composition and distribution of saturation flux density in Co-Ni-Fe ternary alloys. The composition region indicated by A in this figure shows a high saturation flux density and a small magnetostriction constant. Accordingly, alloys with compositions in this region may be expected to show promise as magnetic materials for thin-film magnetic heads. A magnetic thin film with a magnetostriction constant of zero and a high saturation flux density is described in U.S. Pat. No. 4,661,216.

However, the effective resistivity of the aforementioned Co-Ni-Fe ternary alloys in the composition region indicated by A in FIG. 4 is low, i. e., approximately 10 mW◊ cm. As a result, thin-film magnetic heads using Co-Ni-Fe ternary alloys suffer from the following new problems: i. e., both the writing characteristics and the reading characteristics are unstable in the high-frequency region, and the high-frequency response characteristics are inferior.

This point may be described in detail as follows:

Specifically, when a thin-film magnetic head is exposed to a change in magnetization, an eddy current is generated inside the magnetic material. Furthermore, as the magnetization response frequency of the thin-film magnetic head increases, i. e., as the change in the magnetization of the thin-film magnetic head per unit time increases, the eddy current flowing through the interior of the magnetic material increases.

Meanwhile, this eddy current generates a magnetic flux which hinders the change in magnetic flux [sic] according to Lenz's law. As a result, the change in magnetization is suppressed as the frequency of the signal increases. Here, the eddy current flowing through the magnetic material is inversely proportional to the resistivity of the magnetic material.

Furthermore, as was described above, the value of the effective resistivity is low in the abovementioned composition region of Co-Ni-Fe ternary alloys, so that both the writing characteristics and reading characteristics are unstable in the high-frequency region. Accordingly, in cases where thin-film magnetic heads are manufactured using such alloys, the high-frequency response characteristics are inferior.

Good high-frequency response characteristics are indispensable in the magnetic materials of thin-film magnetic heads used in high-density recording. Accordingly, raising the resistivity of Co-Ni-Fe ternary alloys has been a technical problem requiring solution in order to allow the use of such alloys in thin-film magnetic heads.

Furthermore, high-resistivity magnetic thin films which have superior high-frequency response characteristics include magnetic thin films which have a hetero-amorphous two-phase structure (Japanese Patent Application Kokai No. 61-264698), and laminated magnetic thin films in which a nonmagnetic layer is laminated with a magnetic layer which has a hetero-amorphous two-phase structure (Japanese Patent Application Kokai No. 1-175707). However, since these films have an amorphous structure, film formation by means of a plating process is practically impossible, and such films must therefore be formed using a dry process such as sputtering, etc. However, since dry processes require a high degree of vacuum, such processes have a poor production efficiency compared to plating processes. Furthermore, because of the burning of resists (indispensable for the formation of fine elements) due to the rise in temperature that occurs during dry processes, milling processes must be used, so that the manufacturing process becomes complicated. Thus, magnetic thin films which have a hetero-amorphous two-phase structure and laminated magnetic thin films in which a nonmagnetic layer is laminated with a magnetic layer which has a hetero-amorphous two-phase structure suffer from drawbacks in terms of production efficiency, and are difficult to use industrially.

Accordingly, a magnetic thin film which allows the utilization of a plating process with superior productivity, and which has a high resistivity and a high saturation flux density, has not yet been developed, nor has any method for manufacturing such a film been developed.

Thus, in view of the abovementioned problems encountered in the prior art, the object of the present invention is to establish a method in which an electroplating process is utilized in order to manufacture soft magnetic thin films which have a high resistivity and a high saturation flux density, and to develop a method for manufacturing thin film magnetic heads utilizing the abovementioned method for manufacturing magnetic thin films.

Specifically, the object of the present invention is to provide [a] a magnetic thin film [i] which is used mainly as a magnetic material in thin-film magnetic heads suitable for high-density magnetic recording, [ii] which is manufactured by means of a plating process, and [iii] which has a high saturation flux density, superior soft magnetic characteristics and a high resistivity, and [b] a method for manufacturing such magnetic thin films.

SUMMARY OF THE INVENTION

A magnetic thin film manufacturing method is disclosed. In one embodiment, an object of treatment is electroplated in a plating bath so that a magnetic thin film is formed on the surface of the object of treatment. The plating bath contains two or more types of ions selected from a set consisting of $Fe^{2+}$ ions, $Ni^{2+}$ ions and $Co^{2+}$ ions, and fine particles of an insulating material are dispersed in the plating bath.

DESCRIPTION OF THE REFERENCE NUMBERS

Figure 1:
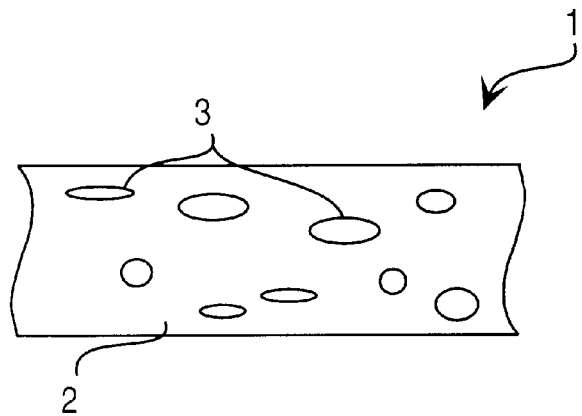
FIG. 1 is a model diagram which illustrates the structure of the magnetic thin film of the present invention.

1 Magnetic thin film
2 Co-Ni-Fe ternary alloy
3 Silica or alumina
10 Thin-film magnetic head
11 Substrate (object of treatment)
15 Lower magnetic thin film
16 Upper magnetic thin film

DETAILED DESCRIPTION

As was described above, magnetic thin films consisting of Co-Ni-Fe ternary alloys offer the advantage of a high saturation flux density, but have a low resistivity, so that thin-film magnetic heads using such magnetic thin films suffer from the drawback of unstable writing and reading characteristics in the high-frequency region.

Accordingly, in order to obtain plated magnetic thin films which have a high resistivity while maintaining the advantageous high saturation flux density of Co-Ni-Fe ternary alloys, the present inventors investigated the addition of silica and alumina to Co-Ni-Fe ternary alloy plating films by adding additives to the plating bath during the formation of films by the plating of such alloys. This research led to the perfection of the present invention.

Specifically, one embodiment of the invention is a magnetic thin film manufacturing method which is characterized by the fact that in a magnetic thin film manufacturing method in which an object of treatment is electroplated in a plating bath so that a magnetic thin film is formed on the surface of said object of treatment, the plating bath contains two or more types of ions selected from a set consisting of $Fe^{2+}$ ions, $Ni^{2+}$ ions and $Co^{2+}$ ions, and fine particles of an insulating material are dispersed in the plating bath.

Furthermore, a more particular embodiment of the invention is a magnetic thin film manufacturing method, which is characterized by the fact that [a] the aforementioned two or more types of ions selected from a set consisting of $Fe^{2+}$ ions, $Ni^{2+}$ ions and $Co^{2+}$ ions are supplied by means of sulfates and/or chlorides, [b] the plating bath is an acidic bath, and [c] the fine particles of an insulating material that are dispersed in the plating bath are colloidal particles of $SiO_2$ and/or $Al_2O_3$.

Furthermore, an invention which constitutes a magnetic thin film utilizing the abovementioned inventions is a magnetic thin film which is manufactured by a previously described magnetic thin film manufacturing method, and in which fine particles of an insulating material are dispersed in a thin film of a magnetic alloy.

Furthermore, another invention which is used in order to achieve the abovementioned object is a magnetic thin film which is characterized by the fact that $SiO_2$ and/or $Al_2O_3$ are dispersed in a thin film consisting of an Fe-Ni-Co alloy.

Furthermore, an invention which applies the abovementioned inventions to the manufacture of thin-film magnetic heads is a thin-film magnetic head manufacturing method which is characterized by the fact that in a thin-film magnetic head manufacturing method in which two or more magnetic thin films and conductive coil films which are interposed between said magnetic thin films are formed on the surface of a substrate, and a magnetic circuit is constructed by means of said magnetic thin films and conductive coil films, at least one of the magnetic thin films is formed by a previously described magnetic thin film manufacturing method.

Magnetic thin films manufactured by the method of the present invention, and the magnetic thin film of the present invention, contain fine particles of an insulating material dispersed in the thin film, and thus have a high resistivity.

As was described above, the eddy current that flows through a magnetic material is inversely proportional to the resistivity of said magnetic material. Accordingly, in the magnetic thin film of the present invention, the resistivity of the magnetic material is high, so that the decrease in the change in magnetism caused by the abovementioned eddy current is suppressed. As a result, thin-film magnetic heads using the magnetic thin film of the present invention have superior high-frequency response characteristics.

A working configuration of the present invention will be described below.

FIG. 1 is a model diagram which illustrates the structure of the magnetic thin film of the present invention.

In the present invention, a thin film of a magnetic alloy is formed on the surface of an object of treatment by applying an electroplating technique.

The plating bath used in the present invention contains two or more types of ions selected from a set consisting of $Fe^{2+}$ ions, $Ni^{2+}$ ions and $Co^{2+}$ ions. These ions are electrodeposited on the surface of the object of treatment, and form an alloy.

In the most superior configuration of the present invention, a Co-Ni-Fe ternary alloy is electrodeposited. From this standpoint, it is desirable that the plating bath used in the present invention contain all three of the aforementioned types of ions, i. e., $Fe^{2+}$ ions, $Ni^{2+}$ ions and $Co^{2+}$ ions.

Here, examples of compounds which can be used as the supply source of $Fe^2+$ ions include ferrous sulfate ($FeSO_4 \bullet 7H_2O$), ferrous chloride ($FeCl_2 \bullet 7H_2O$), ferrous nitrate ($Fe(NO_3)_2$), ferrous fluoroborate ($Fe(BF_4)_2$) and ferrous sulfamate ($Fe(SO_3 \bullet NH_2)_2$), etc. These compounds may be used singly, or may be selectively mixed.

Furthermore, in the present invention, it is desirable from the standpoint of achieving a high density in the thin film to use ferrous sulfate ($FeSO_4 \bullet 7H_2O$) or ferrous chloride ($FeCl_2 \bullet 4H_2O$) as the supply source of $Fe^{2+}$ ions. The most suitable supply source of $Fe^{2+}$ ions, as indicated by its common use in magnetic plating, is ferrous sulfate ($FeSO_4 \bullet 7H_2O$).

Furthermore, examples of compounds which can be used as the supply source of $Ni^{2+}$ ions include nickel sulfate ($NiSO_4 \bullet 6H_2O$), nickel chloride ($NiCl_2 \bullet 6H_2O$), nickel formate ($Ni(COOH)_2$), nickel sulfamate ($Ni(NH_2SO_3)_2$), nickel fluoroborate ($Ni(BF_4)_2$) and nickel bromide ($NiBr_2$), etc. These compounds may be used singly, or may be selectively mixed.

Moreover, in the present invention, nickel sulfate ($NiSO_4 \cdot 6H_2O$) and nickel chloride ($NiCl_2 \cdot 6H_2O$), which are ordinarily used in alloy plating, are most suitable for use as the supply source of $Ni^{2+}$ ions.

Furthermore, cobalt sulfate ($CoSO_4 \cdot 7H_2O$) and cobalt chloride ($CoCl_2 \cdot 6H_2O$), etc., may be used singly or in combination as the supply source of $Co^{2+}$ ions.

Furthermore, as the characteristic constitution of the present invention, fine particles of an insulating material are dispersed in the plating bath. Examples of fine particles of insulating materials which can be used include fine particles of $SiO_2$, $Al_2O_3$, $CrO_3$, $TiO_2$, $ZrO_2$, SiC, $Si_3N_4$, WC, $ZrB_2$ and CrB, etc.

The abovementioned fine particles of insulating materials may be used singly or in selective mixtures; in particular, it is recommended that $SiO_2$ or $Al_2O_3$ be used singly.

In the case of $SiO_2$ and $Al_2O_3$, a particle size of approximately 10 nm to 30 nm is appropriate.

In concrete terms, $SiO_2$ or $Al_2O_3$ is mixed with the plating bath by adding a silica sol or alumina sol to the plating bath, so that the substance added is dispersed in the plating bath as colloidal particles.

When the object of treatment is electroplated with all three of the abovementioned types of ions, i. e., $Fe^{2+}$ ions, $Ni^{2+}$ ions and $Co^{2+}$ ions, included in the plating bath, and with $SiO_2$ (silica) or $Al_2O_3$ (alumina) included in the plating bath, a magnetic thin film is formed on the surface of the object of treatment by a Co-Ni-Fe ternary alloy plating film, and $SiO_2$ or $Al_2O_3$ is dispersed in this magnetic thin film. FIG. 1 shows a model of the structure of a magnetic thin film manufactured by the magnetic thin film manufacturing method of the present working configuration.

Specifically, in the magnetic thin film 1 of the present working configuration, insulating silica or alumina 3 is dispersed in the interior of a Co-Ni-Fe ternary alloy 2 (magnetic material).

As a result, the resistivity of this Co-Ni-Fe ternary alloy plating film is increased.

The contents of the $Fe^{2+}$ ions, $Ni^{2+}$ ions and $Co^{2+}$ ions in the plating bath are adjusted in accordance with the plating conditions. Here, it is desirable that the Fe concentration in the film be low in order to obtain a film which has a small magnetostriction constant.

The concentration of silica or alumina, etc., in the plating bath is adjusted in accordance with the plating conditions. In order to obtain a higher saturation flux density, it is desirable that the pH of the plating bath be in the range of 2 to 4. Specifically, in cases where the pH of the plating bath is greater than 4, there is a possibility that oxidation of the $Fe^{2+}$ will occur. Conversely, in cases where the pH of the plating bath is less than 2, there is a possibility that hydrogen will be generated at the surface of the object of treatment, so that control of the film thickness becomes difficult, and so that a magnetic thin film with a rough surface is formed.

Furthermore, in order to obtain a higher saturation flux density, it is desirable that the Co content in the magnetic material 2 be 50 wt % or greater, and that the Fe content be 5 wt % or greater. Moreover, in order to obtain superior soft magnetic characteristics, it is desirable that the Co content be 90 wt % or less, and that the Fe content be 30 wt % or less.

Combining these two points, it is desirable that the Co content in the magnetic thin film be in the range of 50 wt % to 90 wt %, and that the Fe content be in the range of 5 wt % to 30 wt %.

Furthermore, in order to control the drop in the saturation flux density to 20% or less, it is desirable that the proportion of silica or alumina in the magnetic thin film 1 be 20 wt % or less.

Moreover, in order to obtain superior soft magnetic characteristics, it is recommended that a magnetic field be applied during plating film formation. More concretely, it is desirable that a magnetic field of 50 gauss or greater be applied.

Furthermore, in order to obtain a smooth surface, it is desirable that the current density during plating be 6.0 $mA/cm^2$ or less.

Next, a working configuration in which the abovementioned magnetic thin film manufacturing method is applied to the manufacture of a thin-film magnetic head will be described.

Figure 2:
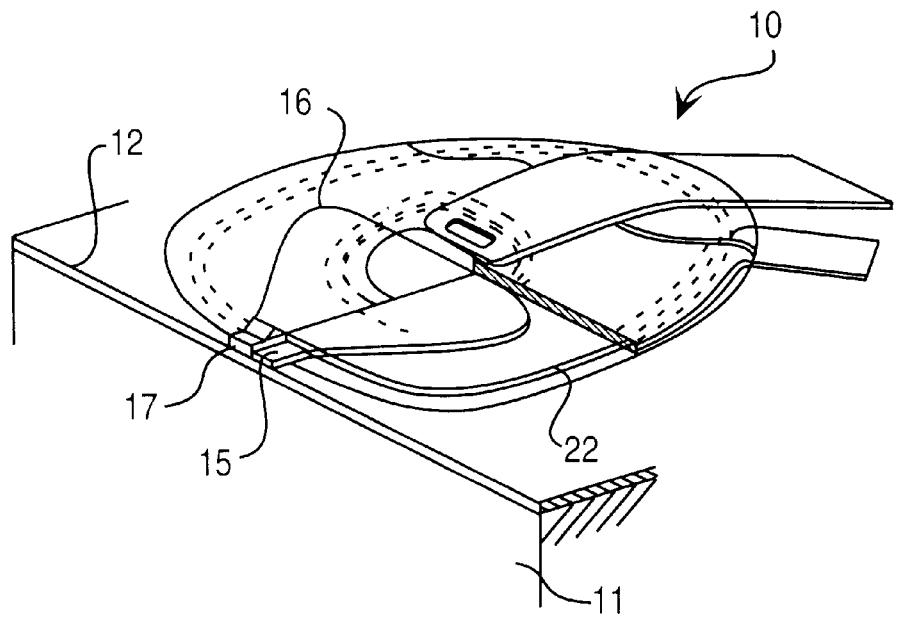
FIG. 2 is a schematic perspective view of a thin-film magnetic head manufactured by the method of the present invention.
Figure 3:
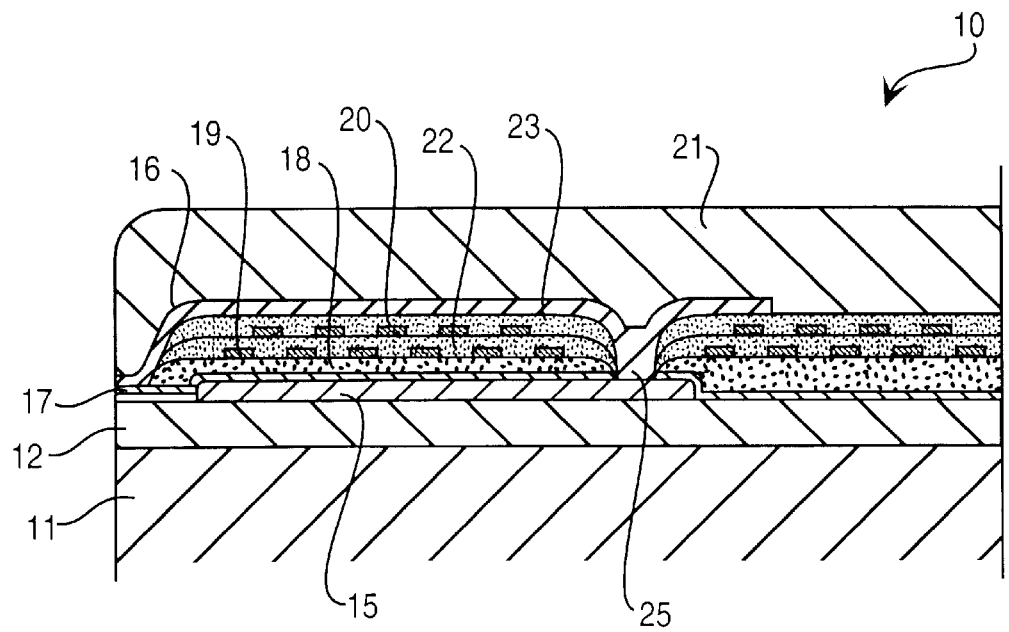
FIG. 3 is a longitudinal sectional view of the thin-film magnetic head shown in FIG. 2.
Figure 4:
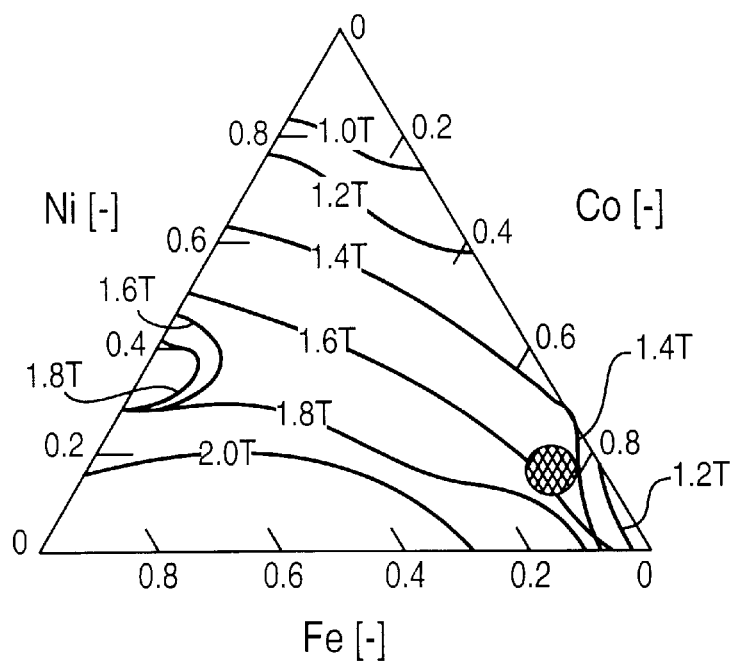
FIG. 4 is an explanatory diagram illustrating the distribution of the saturation flux density in a Co-Ni-Fe ternary alloy.

FIG. 2 is a schematic perspective view of a thin-film magnetic head manufactured according to the present invention. FIG. 3 is a longitudinal sectional view of the thin-film magnetic head shown in FIG. 2.

As is universally known, the thin-film magnetic head 10 uses a substrate (object of treatment) 11 consisting of an $Al_2O_3$–TiC ceramic, etc., as a base; an insulating film 12 is formed on the substrate 11, and a layer constituting a magnetic circuit is laminated on the surface of this insulating film 12.

Specifically, the thin-film magnetic head 10 has a lower magnetic thin film 15 and an upper magnetic thin film 16; furthermore, a gap film 17, insulating films 18, 19 and 20 and conductive coil films 22 and 23 are interposed between the lower magnetic thin film 15 and upper magnetic thin film 16.

Furthermore, the lower magnetic thin film 15 and upper magnetic thin film 16 are bonded together in the area of the rear gap 25 at the rear. Moreover, the front ends of the lower magnetic thin film 15 and upper magnetic thin film 16 face each other across the gap film 17, so that a magnetic gap is formed in this area.

In addition, the conductive coil film 22 is installed in the form of a coil which is centered on the area of bonding between the lower magnetic thin film 15 and the upper magnetic thin film 16 (i. e., on the rear gap 25).

The manufacturing process used to manufacture a thin-film magnetic head applying the present invention is as follows:

Specifically, the substrate 11 consisting of an $Al_2O_3$–TiC ceramic, etc., is subjected to a prescribed pre-treatment, after which the insulating film 12 consisting of $Al_2O_3$ is laminated on the substrate by sputtering.

Then, the lower magnetic thin film 15 is laminated on the surface of the insulating film 12; the aforementioned magnetic thin film manufacturing process is applied in this lamination process.

In concrete terms, a plating under-film (not shown in the figures) is formed on the surface of the insulating film 12, and the surface of this under-film is coated with a photo-resist by means of spin coating, etc. Then, a photo-mask is placed on the surface of the photo-resist, and the masked photo-resist is exposed and developed so that a resist frame with a prescribed shape is patterned on the surface of the insulating film 12.

Next, the substrate 11 is immersed in a barrel plating vat, and electroplating is performed. The plating bath in this barrel plating vat contains $Fe^{2+}$ ions, $Ni^{2+}$ ions and $Co^{2+}$ ions, and also contains $SiO_2$ (silica) or $Al_2O_3$ (alumina).

In this electroplating process, the resist fame acts as a mask, so that a lower magnetic thin film 15 with a prescribed pattern is formed. This lower magnetic thin film consists of a Co-N-Fe ternary alloy, and $SiO_2$ or $Al_2O_3$ is dispersed in said alloy.

Afterward, the resist frame and the excess plating under-film are removed by means of a universally known etching process.

Next, the gap film 17 consisting of $Al_2O_3$ is laminated by means of a universally known sputtering process.

Next, the insulating film 18 is laminated. The insulating film 18 is a layer which is formed from an organic insulating resin such as a novolak resin, etc. This film is formed by applying a novolak resin, etc., to the surfaces of the lower magnetic thin film 15 and gap film 17, soft-baking the resin coating film, applying a photo-mask, performing exposure and development treatments and performing a heat treatment.

Furthermore, a Cu conductive coil film 22 is laminated on the surface of the insulating film 18. A universally known electroplating technique is used for the lamination of this conductive coil film 22. Furthermore, the means used to pattern the conductive coil film 22 is substantially the same as that used in the case of the aforementioned lower magnetic thin film 15.

Afterward, the abovementioned insulating film lamination and conductive coil film lamination are repeated so that the insulating films 19 and 20 and conductive coil film 23 are formed.

Furthermore, the upper magnetic thin film 16 is laminated on top of the aforementioned films. The means used to laminate the upper magnetic thin film is similar to that used in the case of the aforementioned lower magnetic thin film. Electroplating is performed in plating bath which contains $Fe^{2+}$ ions, $Ni^{2+}$ ions and $Co^{2+}$ ions, and which also contains $SiO_2$ (silica) or $Al_2O_3$ (alumina), thus forming a layer in which $SiO_2$ or $Al_2O_3$ is dispersed in a Co-Ni-Fe ternary alloy.

Furthermore, a protective layer 21 consisting of $Al_2O_3$, etc., is formed on top of the upper magnetic thin film 16 by a method such as sputtering, etc.

In the thin-film magnetic head manufactured as described above, the magnetic thin films 15 and 16 have a high resistivity, a high saturation flux density and superior soft magnetic characteristics. Accordingly, the thin-film magnetic head 10 has stable writing and reading characteristics in the high-frequency region, and has superior high-frequency response characteristics.

Embodiments of the present invention and experiments performed in order to confirm the effect of the present invention will be described below.

In these embodiments, the present invention is applied to a thin-film magnetic head, and the object of treatment in each case is a wafer. In the respective examples, a glass substrate or an $Al_2O_3$–TiC ceramic was used as the abovementioned wafer, and a permalloy alloy film (thickness: approximately 1000 angstroms) was formed as an underfilm by sputtering at the time of use.

The composition of the plating bath used in the experiments is shown in Table 1.

TABLE 1

| Composition of Plating Bath | |
|---|---|
| Bath Component | Amount Added |
| Ferrous sulfate ($FeSO_4.7H_2O$) | 0.1 mol/liter |
| Nickel sulfate ($NiSO_4.6H_2O$) | 0.115 mol/liter |
| Nickel chloride ($NiCl_2.6H_2O$) | 0.115 mol/liter |
| Cobalt sulfate ($CoSO_4.7H_2O$) | 0.055 mol/liter |
| Cobalt chloride ($CoCl_2.6H_2O$) | 0.055 mol/liter |
| Boric acid ($H_3BO_3$) | 10 mol/liter |
| Saccharine sodium | 1.5 g/liter |
| Sodium dodecylsulfate | 0.1 g/liter |
| Silica sol | As in Table 2 |
| Alumina sol | As in Table 3 |

In Table 1, the boric acid is added as a pH buffering agent. The saccharine sodium is added in order to reduce the stress in the plating film, and the sodium dodecylsulfate is added as a plating film surfactant.

Furthermore, in addition to the ingredients shown in Table 1, hydrochloric acid is added in order to adjust the pH of the plating bath; in this case, the pH of the plating bath is adjusted to 3.0.

A silica sol was added to a plating bath of the composition described above at six different concentrations ranging from 0.08 g/liter to 23.4 g/liter, and wafers were electroplated using the resulting plating bath compositions. The silica sol that was added contained 20% silicic anhydride ($SiO_2$). Accordingly, the respective plating baths contained silicic anhydride in six concentrations ranging from 0.016 g/liter to 4.6 g/liter.

Furthermore, the temperature of each plating bath was set at 35±0.1 [∞C] by means of an electronic thermostat device. The rate at which each plating bath was fed into the plating vat was 4 liters per minute. The current density was maintained at 6.0 $mA/cm^2$ or less.

As a result, magnetic thin films consisting of a Co-Ni-Fe ternary alloy were formed on the surfaces of the glass-substrate wafers.

The film compositions, magnetic characteristics and resistivities of these magnetic thin films were measured.

The results obtained are shown in Table 2.

TABLE 2

Silica Sol Concentrations in Plating Baths and Magnetic Characteristics of Magnetic Thin Films

| | | Silica sol concentration in bath | Magnetic thin film composition (wt %) | | | Magnetic characteristics | | | Resistivity |
|---|---|---|---|---|---|---|---|---|---|
| | No | [g/liter] | Co | Ni | Fe | Bs[T] | Hc[Oe] | Hk[Oe] | $\mu\Omega$ cm |
| Comparative Example | | 0 (0) | 73.67 | 18.61 | 7.62 | 1.8 | 0.8 | 13 | 12 |
| Embodiment | 1 | 0.08(0.016) | 74.21 | 19.91 | 5.89 | 1.8 | 0.9 | 12 | 12 |
| | 2 | 0.31(0.062) | 74.91 | 18.71 | 6.38 | 1.6 | 0.9 | 13 | 14 |
| | 3 | 0.82(0.164) | 74.29 | 18.92 | 6.80 | 1.6 | 0.6 | 14 | 14 |
| | 4 | 3.32(0.664) | 75.23 | 19.26 | 5.52 | 1.5 | 0.8 | 14 | 14 |
| | 5 | 8.29(1.658) | 75.40 | 18.94 | 5.66 | 1.5 | 1.1 | 14 | 14 |
| | 6 | 23.4(4.68) | 75.17 | 18.56 | 6.27 | 1.5 | 0.8 | 14 | 15 |

The values in parentheses indicate the concentration of $SiO_2$ in each plating bath.

It is seen from Table 2 that the resistivity of the plating film rises conspicuously as a result of the addition of a silica sol to the plating bath. From the standpoint of increasing the resistivity of the plating film, it is desirable to add a large amount of silica sol to the plating bath.

However, it was ascertained from experiments that the saturation flux density decreases monotonically with an increase in the amount of silica sol in the plating bath. Accordingly, the most appropriate amount of silicic anhydride in the plating bath is 0.31 to 23 g/liter.

Furthermore, similar measurements were performed using an alumina sol instead of a silica sol. The results obtained are shown in Table 3.

TABLE 3

Alumina Sol Concentrations in Plating Baths and Magnetic Characteristics of Magnetic Thin Films

| | Alumina sol concentration in bath | Magnetic thin film composition (wt %) | | | Magnetic characteristics | | | Resistivity |
|---|---|---|---|---|---|---|---|---|
| | No [g/liter] | Co | Nl | Fe | Bs[T] | Hc[Oe] | Hk[Oe] | $\mu\Omega$ cm) |
| Comparative Example | 0 | 79.67 | 18.61 | 7.62 | 1.8 | 0.8 | 13 | 12 |
| Embodiment | 1 0.05(0.01) | 74.07 | 18.13 | 7.80 | 1.7 | 1.2 | 13 | 13 |
| | 2 0.3(0.06) | 74.47 | 17.99 | 7.53 | 1.7 | 0.9 | 13 | 13 |
| | 3 0.8(0.16) | 74.57 | 17.96 | 7.45 | 1.6 | 0.9 | 13 | 14 |
| | 4 3.3(0.66) | 74.44 | 19.07 | 6.49 | 1.4 | 1.4 | 12 | 15 |
| | 5 8.3(1.66) | 74.38 | 18.75 | 6.87 | 1.4 | 1.3 | 12 | 19 |
| | 6 23.3(4.66) | 74.20 | 18.70 | 7.10 | 1.4 | 1.2 | 12 | 17 |

The values in parentheses indicate the concentration of $Al_2O_3$ in each plating bath.

A tendency similar to that seen in cases where a silica sol was added to the plating bath was also seen in cases where an alumina sol was used. Specifically, it was found that the resistivity of the plating film increases conspicuously as a result of the addition of an alumina sol to the plating bath, and that the saturation flux density decreases monotonically with an increase in the amount of alumina sol in the plating bath.

Accordingly, the most appropriate amount of alumina in the plating bath 0.8 to 8.3 g/liter.

The magnetic thin film of the present invention has a high saturation flux density, superior soft magnetic characteristics and a high resistivity. Accordingly, the magnetic thin film of the present invention is suitable for use as a magnetic material in thin-film magnetic heads, and thin-film magnetic heads which employ the magnetic thin film of the present invention show superior writing and reading performance, and have good high-frequency response characteristics.

Furthermore, the magnetic thin film manufacturing method of the present invention utilizes electroplating, and allows the mass production of magnetic thin films which have superior soft magnetic characteristics and a high resistivity.

In addition, the thin-film magnetic head of the present invention shows superior writing and reading performance, and has good high-frequency response characteristics.

What is claimed is:

1. A magnetic thin film manufacturing method comprising the steps of electroplating an object of treatment in a plating bath so that a magnetic thin film is formed on a surface of said object of treatment, the plating bath containing two or more metal ions selected from the group consisting of $Fe^{2+}$ ions, $Ni^{2+}$ ions and $Co^{2+}$ ions, and dispersing $SiO_2$, $Al_2O_3$, or a combination thereof in the plating bath, the fine particles having a size less than approximately 30 nm, the magnetic thin film having a Co weight content of at least 50%.

2. The magnetic thin film manufacturing method claimed in claim 1 wherein the two or more metal ions selected from the group consisting of $Fe^{2+}$ ions, $Ni^{2+}$ ions and $Co^{2+}$ ions are supplied by means of sulfates, chlorides, or a combination thereof, and the plating bath is an acidic bath.

3. The magnetic thin film manufacturing method claimed in claim 1, wherein the magnetic thin film is included in a thin film magnetic head.

\* \* \* \* \*